(No Model.) 6 Sheets—Sheet 3.
F. BRAMER & G. G. CROWLEY.
HARVESTER.
No. 263,383. Patented Aug. 29, 1882.
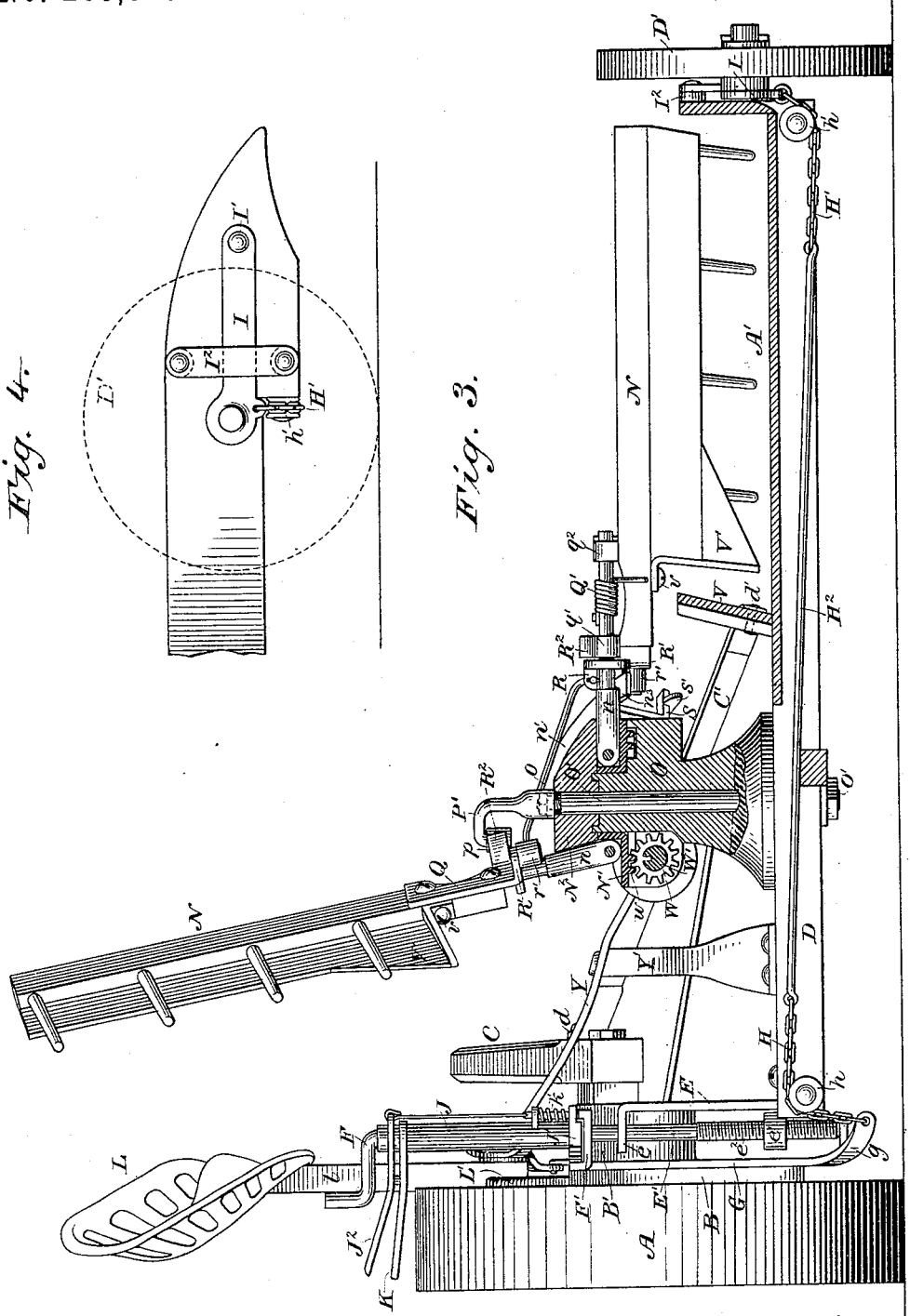
INVENTORS
Frank Bramer.
George G. Crowley.
By their Attorneys
Baldwin, Hopkins, Peyton.
WITNESSES
Wm A. Skinkle.
Geo. W. Breck.

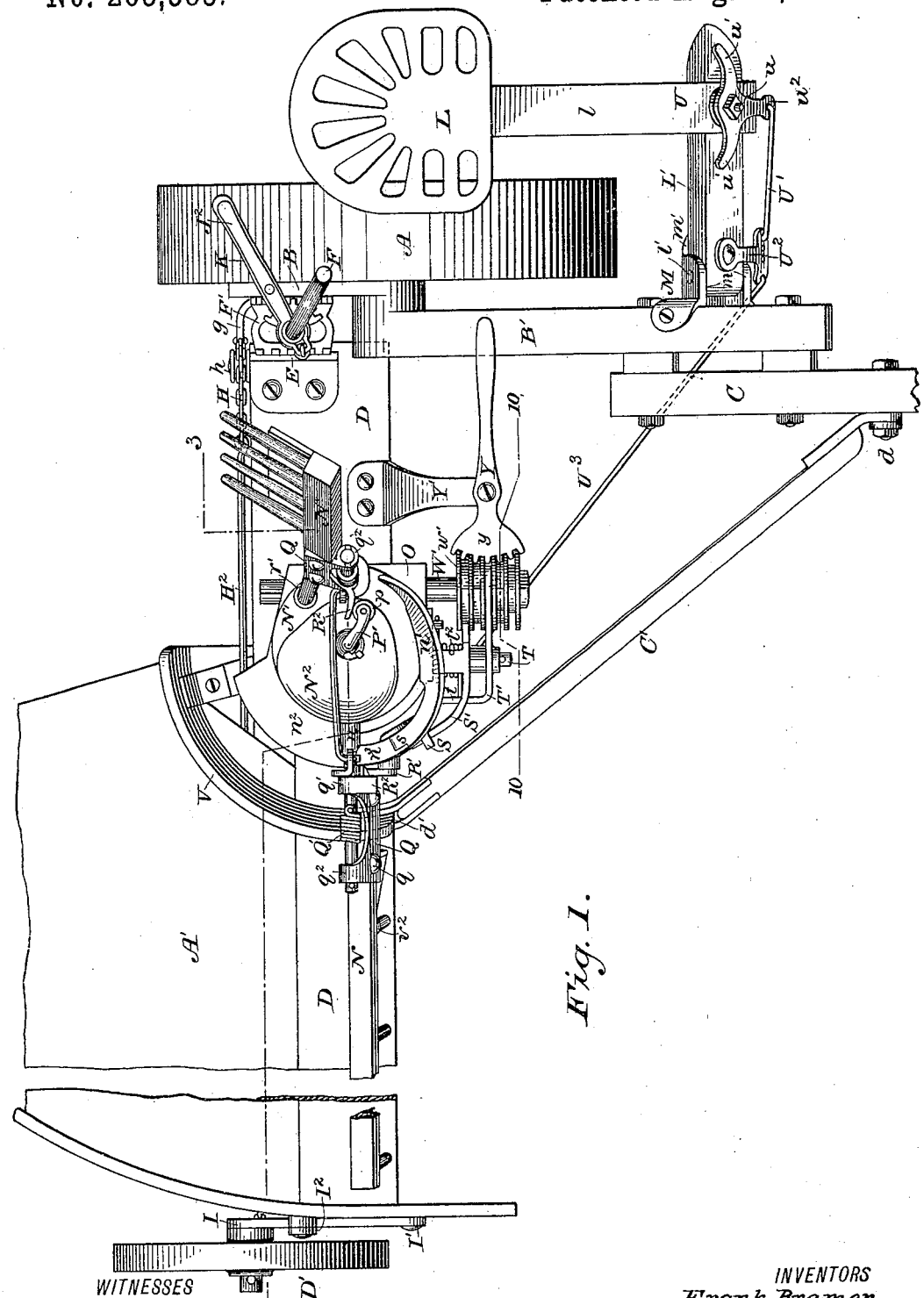

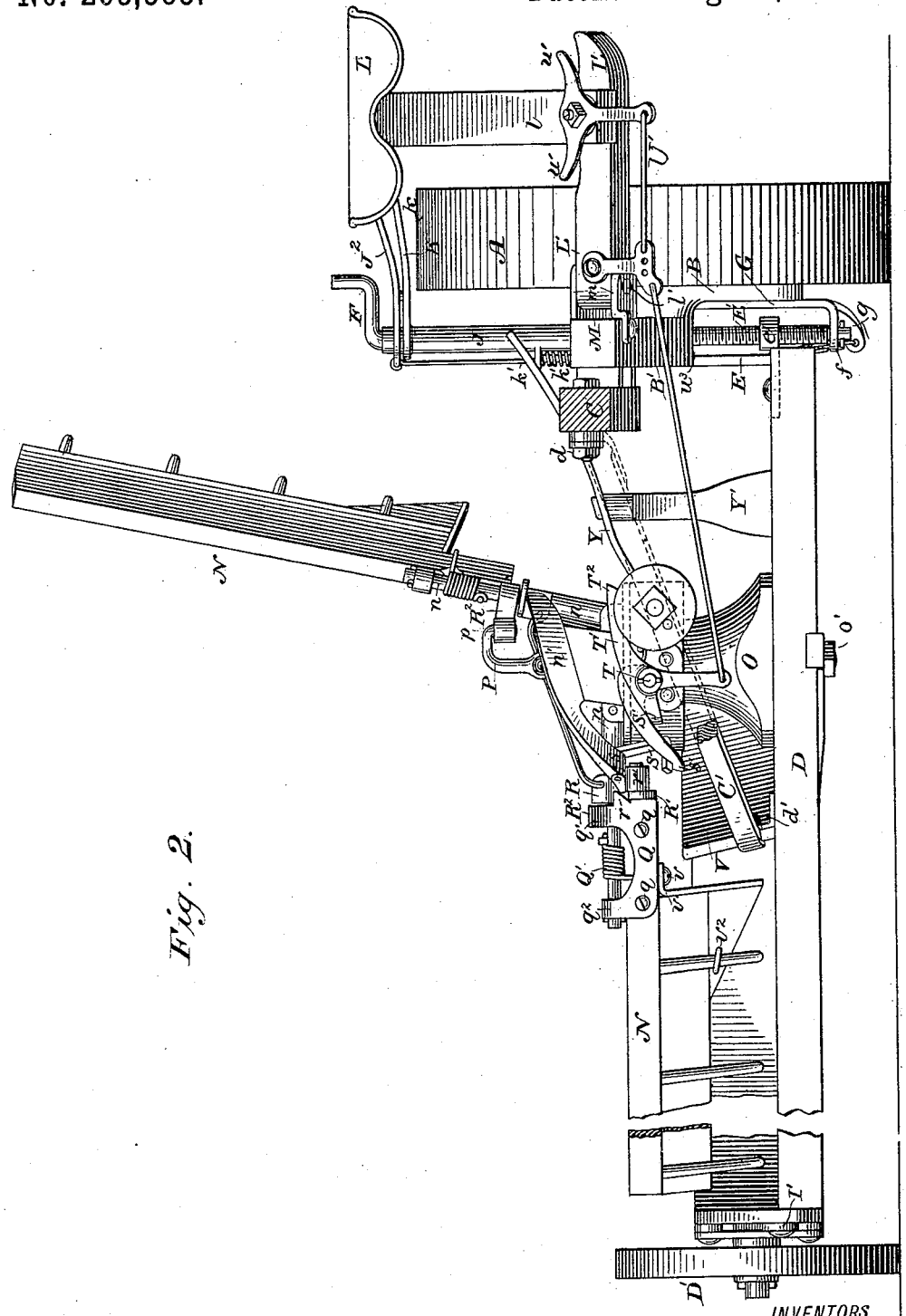

(No Model.) 6 Sheets—Sheet 4.
F. BRAMER & G. G. CROWLEY.
HARVESTER.

No. 263,383. Patented Aug. 29, 1882.

WITNESSES

INVENTORS
Frank Bramer
George G Crowley
By their Attorneys (No Model.) 6 Sheets—Sheet 5.
F. BRAMER & G. G. CROWLEY.
HARVESTER.
No. 263,383. Patented Aug. 29, 1882.
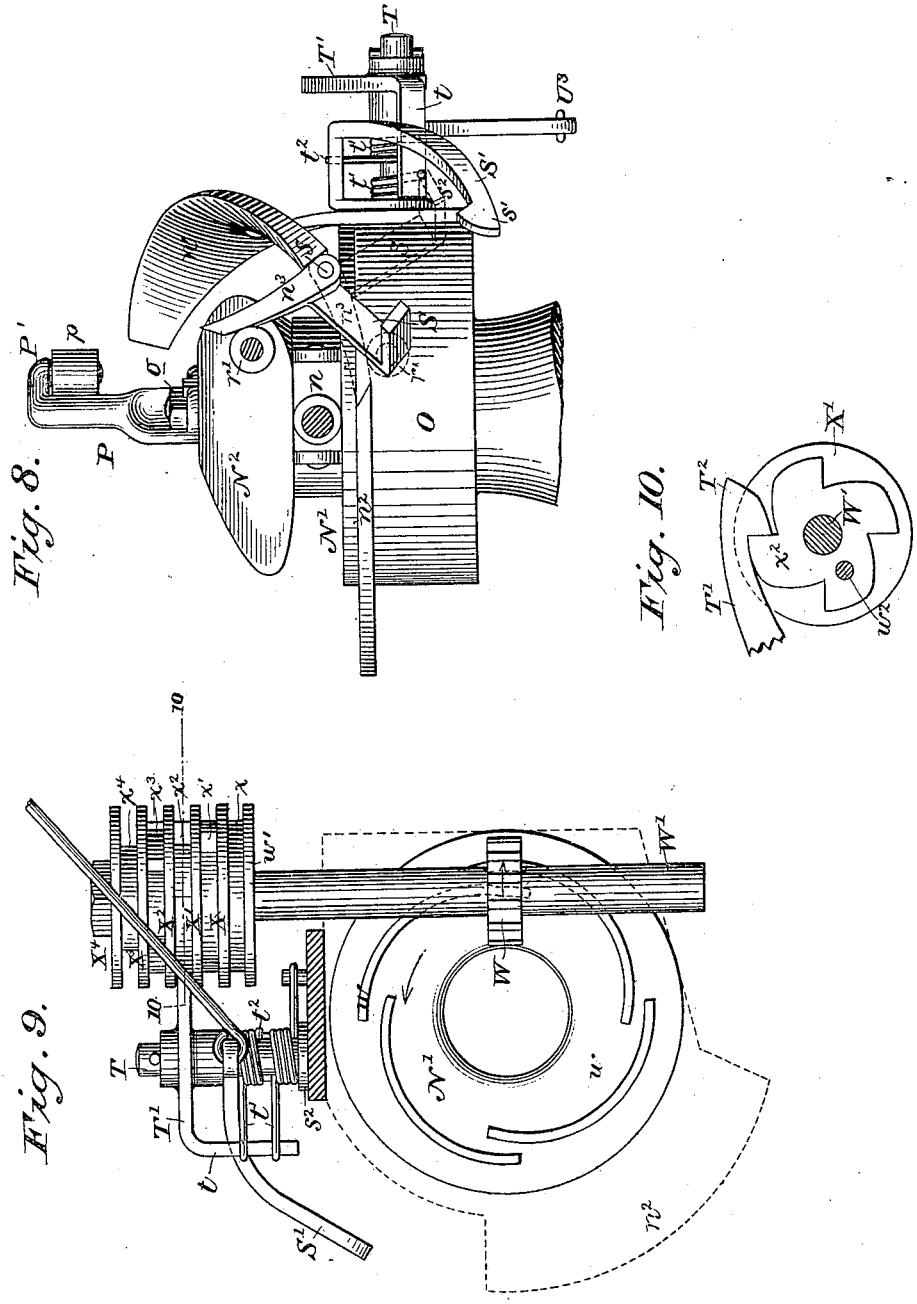
WITNESSES
INVENTORS
Frank Bramer
George. G. Crowley.
By their Attorneys (No Model.) 6 Sheets—Sheet 6.
F. BRAMER & G. G. CROWLEY.
HARVESTER.
No. 263,383. Patented Aug. 29, 1882.
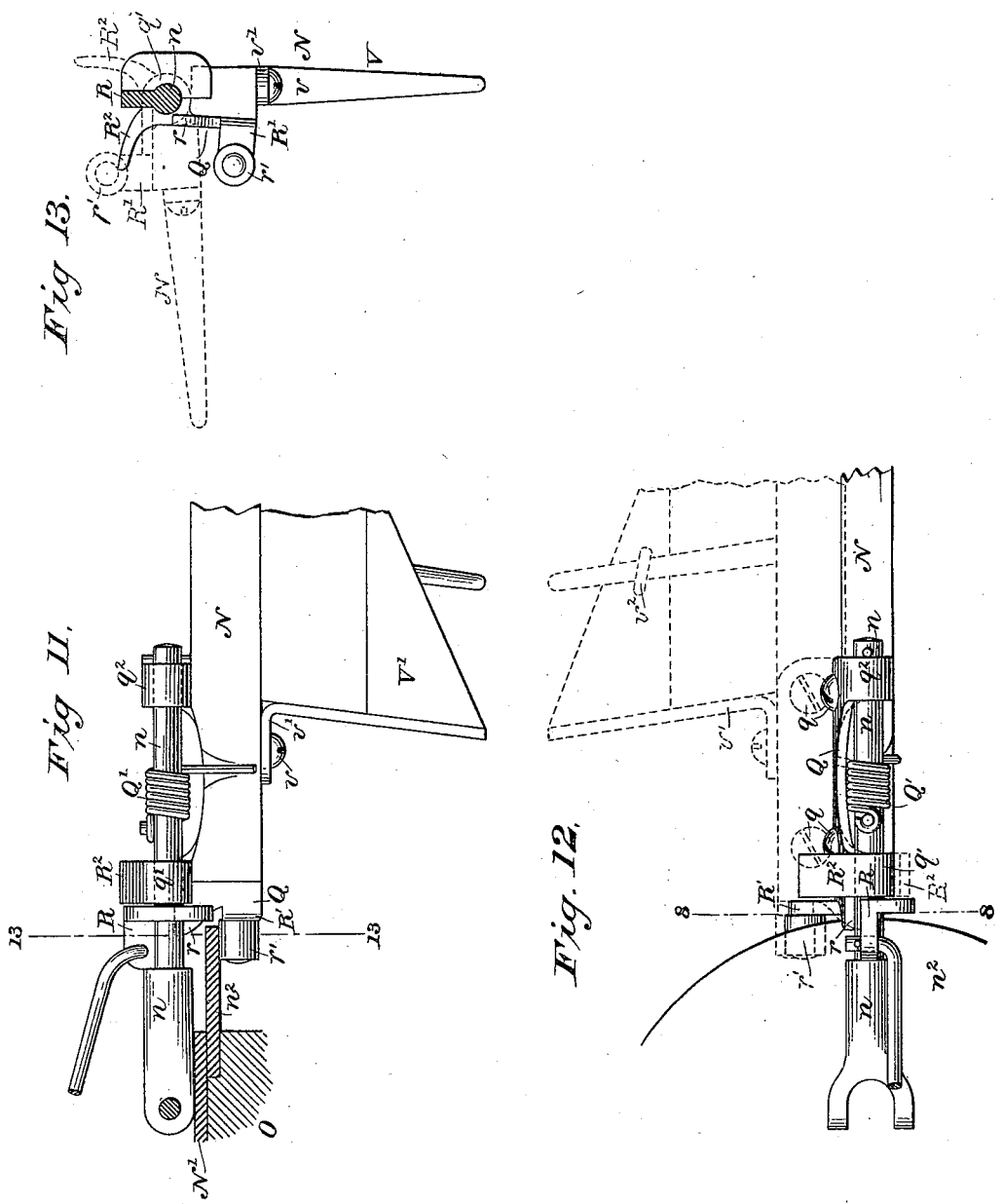
WITNESSES
Wm A. Skinkle.
Geo. W. Breck.
INVENTORS
Frank Bramer
George G. Crowley,
By their Attorneys
Baldwin, Hopkins, & Peyton.

UNITED STATES PATENT OFFICE.

FRANK BRAMER AND GEORGE G. CROWLEY, OF LITTLE FALLS, NEW YORK.

HARVESTER.

SPECIFICATION forming part of Letters Patent No. 263,383, dated August 29, 1882.

Application filed March 27, 1882. (No model.)

*To all whom it may concern:*

Be it known that we, FRANK BRAMER and GEORGE G. CROWLEY, both of Little Falls, in the county of Herkimer and State of New York, have invented certain new and useful Improvements in Harvesters, of which the following is a specification.

Our invention relates to improvements in harvesters, applicable chiefly to the class known as "one-wheel machines," especially such machines of this class as are provided with continuously-rotating rising and falling combined rakes and reels of the type in which the rake-heads are adapted to oscillate or swing about their longitudinal axes, so that the rake-teeth may be caused to rock up to pass clear of cut grain upon the platform or be held down to sweep the grain in gavels from the platform.

Our improvements, as will hereinafter be distinctly claimed, pertain to certain novel features of construction and combinations of devices, among which may be mentioned means for raising and lowering the finger-beam, mechanism for rocking the finger-beam, an attachment to the rake-head for preventing entanglement of the grain with the rake, mechanism for supporting the rake-heads on the carrying-arms, means for rocking the rake-heads, and rake-controlling mechanism by which to adjust and predetermine the action of the rakes to cause the rake-teeth to act automatically upon the grain on the platform at longer or shorter intervals, according to the character of the crop.

The accompanying drawings represent a suitable application of our improvements to a one-wheel rigid-tongue machine.

Such old features of a fully-organized machine as are neither illustrated by the annexed drawings nor in detail described herein may be of any desired and proper construction; and some of our improvements may be used without the others and in machines differing in some respects from that shown by the drawings and particularly described.

Figure 5:
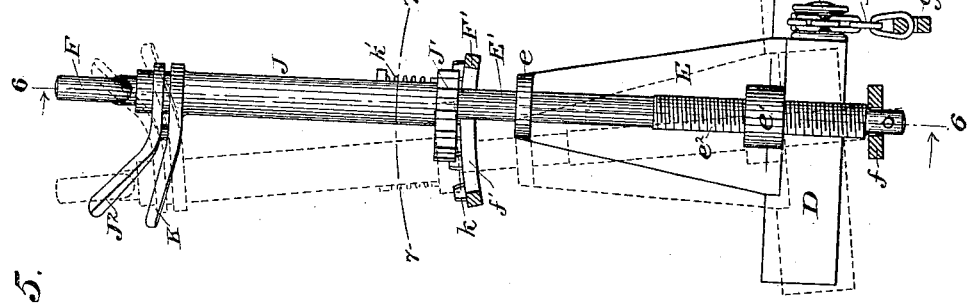
Figure 7:
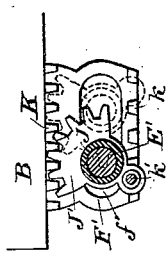
Figure 6:
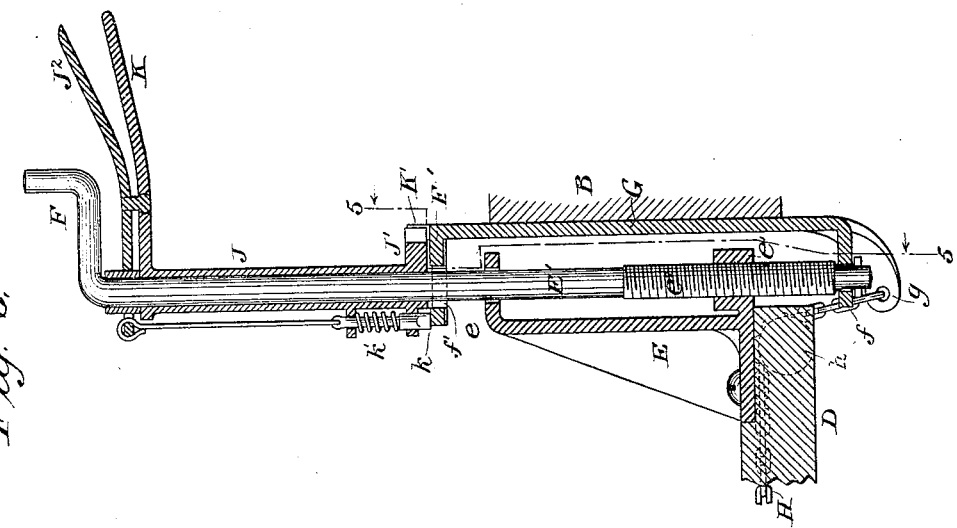

Figure 1 is a plan or top view, the tongue and the platform, &c., being broken away. Fig. 2 is a front elevation, with the diagonal tongue-brace or draw-bar partly represented in dotted lines. Fig. 3 is a view partly in rear elevation and partly in vertical section on the line 3 3 of Fig. 1. Fig. 4 is a view in elevation of the outer front corner of the platform, showing the means for supporting the grain-wheel, which is represented in dotted lines. Fig. 5 is a view, partly in side elevation and partly in section on the line 5 5 of Fig. 6, representing the mechanism for raising and lowering and rocking the finger-beam and platform; Fig. 6, a view partly in front elevation and partly in section on the line 6 6 of Fig. 5; Fig. 7, a view partly in plan and partly in section on the line 7 7 of Fig. 5. Fig. 8 is a view in elevation, showing on an enlarged scale details of the rake-tripping mechanism, the turning yoke or oscillating rake-head-supporting bracket and the short rake-carrying arm being in section, as indicated by the line 8 8 of Fig. 12, the parts occupying the positions assumed at the time just after the rake-teeth are turned up to pass over the platform clear of the grain. Fig. 9 is an inverted plan or view as seen from the under side, showing details of the mechanism for controlling the actuations of the rake to cause the rakes to operate automatically at any desired intervals; Fig. 10, a section on the line 10 10 of Fig. 9, showing one of the cams of the rake-controlling mechanism. Fig. 11 is a rear elevation of a portion of one of the rakes, the rake-head being represented as in the position assumed by it when beginning to sweep the platform, the crown-wheel or rotating rake-carrier being omitted and the camway and rake-standard being in part represented in section; Fig. 12, a plan view with the parts as in Fig. 11. The dotted lines represent the rake-head as turned to elevate the teeth above the platform; and Fig. 13, a view partly in end elevation and partly in section on the line 13 13 of Fig. 11, the rake being shown in full lines with its teeth depressed and in dotted lines with the teeth elevated.

A single driving-wheel, A, a main frame, rocking about the axle of the driving-wheel, and shown as consisting of the rear portion or frame-plate, B, and forwardly-extending portion or arm B', and a stiff tongue, C, having rigid connection with the main frame, are all of usual construction, as are also the grain-platform A', finger-beam D, guards, &c., of the cutting apparatus, and the diagonal brace or draw-bar C′, having jointed connection at its front and rear ends, respectively, with the tongue and the finger-beam and platform by pivots d d′.

The grain-wheel D′ is supported in the usual position and rendered vertically adjustable, as will hereinafter be described.

The finger-beam is provided at its heel with two rigidly-attached inwardly-projecting lugs, e e′. These lugs are arranged the one above the other, and are shown as formed by the two arms or forks of a bifurcated bracket, E, firmly screwed or bolted by its base to the finger-beam. The upper lug, e, is simply perforated, while the lower lug is provided with a female screw to match a screw, $e^2$, upon the lower portion of a rod, E′, which passes through both the lugs e e′. The upper end of this adjusting-rod E′ is provided with a suitable lever or crank, F, by which it may be turned, and at its lower end the rod is shouldered and stepped or loosely fitted in a supporting-lug, f, of the main frame. A cross-pin beneath this supporting-lug prevents upward movement of the turning adjusting-rod. Above the lug e of the finger-beam bracket E the rod E′ is supported in slot f′ in a main-frame lug, F′. The lugs F′ and f are shown as formed at the upper and lower horizontally-projecting ends of a bracket, G, secured to the main frame; but they may be otherwise secured to the frame or be formed with it. A downwardly and inwardly projecting arm, g, of the main frame, (also shown in this instance as formed with the main-frame bracket G,) adjacent to the lug f and near the finger-beam heel, has secured to it one end of a chain, H, which passes over a pulley, h, mounted upon the back edge of the finger-beam heel. A similar pulley, h′, is mounted upon the rear edge of the finger-beam at or near its outer end. A chain, H′, passes under this pulley h′, and is connected by one end with the chain H by a link-rod, $H^2$. At its opposite end the chain H′ is attached to the rear end of a vertically-vibrating arm, I, in which the grain-wheel D′ is mounted. This grain-wheel arm is pivoted at its front end to the outer divider, I′. The guide $I^2$ prevents horizontal play or wabbling motion of the arm I and grain-wheel. Instead of the two chains and rod connecting the grain-wheel and main frame, a single chain or other suitable flexible connection may be employed.

From the above description it will readily be understood that the finger-beam and platform may be raised or lowered relatively to the main frame simultaneously at both ends by turning the screw-rod in the nut or threaded lug e′ of the finger-beam.

To provide for the ordinary rocking or tilting adjustments of the finger-beam and platform, a sleeve, J, is fitted to turn on the rod E′ above the upper or slotted lug, F′, of the main frame. A lever, K, is fastened to this sleeve at its upper end and close to the crank F, and a segment-gear or toothed arc, J′, is rigidly secured to the lower end of the sleeve. This segment-gear meshes with a rack or row of teeth, K′, on the main-frame lug F′, extending in a direction parallel with the length of the slot f′. A detent rack or row of teeth, k, also extending parallel with the length of the slot f′, is provided on the lug F′ at the side of the slot opposite that next which the rack K′ is located. A spring-tooth or detent-rod, k′, controlled by a lever, $J^2$, engages the detent k to lock the parts in their adjusted positions, as will readily be understood. By operating the lever K and turning the sleeve J the sleeve and rod E′ will be moved lengthwise the guide-slot f′ of the lug F′ by the action of the gear J′ on its rack, and the finger-beam-supporting rod be thus rocked in the main-frame supporting-lug f. (See Fig. 5.) The lug F′ is slightly curved vertically for an obvious purpose.

The driver of the machine can from his seat L readily reach and operate the levers for raising and lowering and for rocking the platform. The driver's seat is shown as adapted to be folded or swung inward toward the tongue to reduce the width of the machine and so enable it to be readily passed through gateways or other narrow openings. That the seat may be folded out of the way, as represented in Fig. 3, its support or standard l is secured to a hinged cross-bar or foot-piece, L′, jointed by a pivot, l′, in a supporting-bracket or socket-iron, M, on the forward portion of the main frame. The inner end of the foot-piece rests between the side lugs, m m, and upon the extended base m′ of this bracket, and is thus firmly supported when adjusted to the position in which it is represented in Figs. 1 and 2.

We do not herein claim either the folding driver's seat or the hinged foot-piece, these features of our invention, whether considered apart from or together with other devices, being disclaimed herein.

The combined rake and reel arms or rocking rake-heads N are supported upon short rake-carrying arms n, pivoted to a crown-wheel or similar revolving carrier, N′, as usual. Any desired number of rake-heads may be employed. Two only are shown by the drawings; but four constitute the complete set used in practice upon the machine. The rakes may be driven by any suitable mechanism, so as to impart to them a continuous revolution about an upright axis when the machine is at work. The proper rising and falling movements of the rake-heads are imparted to them by means of suitable cam mechanism, (shown as consisting of a cam-plate, $N^2$, upon the top of the rake block or standard O, and a cam-track, n′ $n^2$.) The carrier N′, cam-plate $N^2$, and the fixed cam-rails or track-sections n′ $n^2$ are supported in suitable way by the rake-standard O, which is secured in position by means of a removable securing-rod, O′, provided with threaded ends for the nuts o o′. The securing-rod passes through the cam-plate, rake-standard, and finger-beam, as usual, to clamp the parts together. This rod also passes through the foot of a bracket or removable standard, P, above the cam-plate. An arm, P', overhanging the cam-plate N², projects inwardly, and is provided at its end with a downwardly-projecting stud carrying a roller, $p$. This overhanging arm is shown as formed with the bracket-standard P, which at its upper end is bent inwardly and forwardly and then downwardly to support the roller $p$. This standard may be readily adjusted to properly locate the roller $p$, the function of which will further on be explained. Instead of the roller $p$, a mere lug may be used. Each rocking rake-head is mounted upon its carrying-arm $n$ by means of a bracket rigidly secured to the rake-head at the heel or inner end thereof, and adapted to oscillate about the hinged rake-carrying arm. Description of one of the brackets and its connections will suffice for all, as the four brackets to be employed, their attachments, and the manner of connecting them with the rake-heads and rake-carrying arms are all alike.

A bracket, Q, is rigidly fastened to the heel of a rake-head, N, by screws $q$ $q$, or in other suitable way, and is provided at its inner and outer ends with perforated ears or lug-bearings $q'$ $q^2$, fitted to oscillate about a rake-carrying arm, $n$. A spring, Q', coiled about and secured to the rake-carrying arm between the bearing-lugs of the bracket, acts by its projecting free end upon the rake-head with a constant tendency to hold it with its teeth elevated, or else to rock the head so as to throw up the teeth. A stop-lug, $r$, at the inner or heel end of the oscillating bracket abuts against a rigid shoulder or rib, R, on the rake-carrying arm to limit the swing of the rake-head when its teeth are rocked upward. These shoulders R on the rake-carrying arms are perforated for attachment of rods, by which these arms are linked together in pairs. A cam-track traveling roller, $r'$, is mounted on a stud secured to and projecting inwardly from a lug, R', projecting laterally from the heel end of the oscillating bracket. A curved arm or trip-lug, R², is secured to or formed with the bracket, and projects laterally therefrom at the inner bearing, $q'$.

The movable switch section or gate $n^3$ of the cam-track between the fixed parts $n'$ $n^2$ of the track is pivoted so as to rock vertically, and when closed bridges the space between the section $n^2$ and the lower or heel end of the section $n'$. This gate $n^3$ is hinged to the fixed section $n'$ of the track by its heel-pivot $s$. A tripper-actuated down-hanging locking-arm, S, projects from the heel end of the switch, with which it is rigidly connected, and is hooked or bent at its lower end to act upon the inclined nose and be engaged by the hook $s'$ of one arm of a vertically-rocking tripping-lever, S', of bell-crank form. The other arm of this tripping-lever connects, as soon to be described, with a treadle to be operated by the driver. The tripping-lever is provided with two bearings, one being formed by an inwardly and downwardly projecting perforated lug, $s^2$, and the other formed in the down-hanging arm of the tripping-lever near its junction with the hook-ended arm. By this forked or double bearing the tripping-lever is pivoted on a suitable support—in this instance shown as formed by a stud-shaft, T, firmly secured to and projecting forwardly from the rake-standard. A lever, T', is mounted to rock vertically on this stud T outside the bell-crank tripping-lever. An inwardly-projecting heel-lug or short arm, $t$, of the lever T' crosses beneath the hook-ended arm of the tripping-lever, and is caused to bear upwardly against the tripping-lever with a yielding or spring pressure. Two springs, $t'$ $t'$, coiled about the stud T, are shown as acting upon the heel projection of the rocking lever T', with a constant tendency to hold it against or move it up to the tripping-lever arm. One of these springs also acts by its end $t^2$ upon the tripping-lever with a constant tendency to hold this lever against the heel-arm $t$ of the lever T', or else to move it downward toward said heel-arm. The lever T' is provided with a curved or inclined nose and a hook or shoulder, T², for a purpose further on to be explained.

The tripper-controlling treadle U is mounted upon the hinged seat-supporting bar L' and rocks upon a pivot, $u$. The treadle is adapted to be operated by either foot of the driver, being provided with two arms, $u'$ $u'$, one for the right foot and the other for the left foot, so that the treadle may readily be rocked in either direction. A link, U', connects the treadle-arm or shank $u^2$ with a vibrating bracket, U², pivoted to the bar L' near its hinged end. This bracket is in turn connected by a long link, U³, with the downwardly-projecting arm of the bell-crank tripping-lever S'.

By means of the above-described link-and-bracket connection between the treadle and tripping-lever it will be seen that either a thrusting or a pulling strain can be exerted upon the tripping-lever to move either up or down its end, which is provided with the hook or shoulder and inclined nose. It is further obvious that the driver's seat may be folded over by swinging the foot-piece upward and inward without interference from the treadle and its connection.

The operation of the raking and reeling devices, so far as they have been above described, is as follows: The driver, by pressing the toe of the right foot on the treadle, and so drawing downward the hooked and curved ended arm of the tripping-lever out of the path of movement of the lower or bent end of the cam-switch arm S, leaves the switch free to rock on the heel-pivot. Each rake-head, as its bracket comes into position to bring its trip-lug R² in contact with the rake-head-turning stud or roller $p$, is oscillated about the rake-carrying arm $n$, and the bracket-roller $r'$ is thus directed outside of or beneath the cam-rail $n'$. In this condition—that is, with the rake-teeth projecting downwardly to catch and reel in the grain—the rake-head, in its revolution with the crown-wheel, passes around until the roller $r'$ comes beneath the switch or gate $n^3$ of the cam. The bracket-spring, acting with a tendency to rock the bracket, presses the roller $r'$ upward and causes it to lift the gate, and next pass above the cam-track $n^2$. The rake-teeth, being now elevated, pass clear of the accumulating grain upon the platform. After each actuation of the cam-gate by the roller $r'$, as the bracket is oscillated, as above explained, the gate drops by gravity into the position shown by the dotted lines in Fig. 8, and its pendent arm S is left in position to be engaged by the tripping-lever at the will of the driver. When grain sufficient to form a gavel has been accumulated upon the platform, the driver, by removing his foot from the treadle, allows the tripping-lever to assume the position into which it is thrown by spring-pressure, (see Figs. 2 and 3;) or, if preferred, the driver may, by pressing the toe of the left foot on the treadle, hold the tripping-lever in position to engage the switch-arm and lock the switch. When the switch is so locked by the engagement of the hook or shoulder $s'$ of the tripping-lever with the switch-arm S the bracket-roller $r'$ passes beneath and in contact with the under side of the switch, and the rake-head is prevented from rocking and its teeth held down to sweep the grain from the platform, as the roller $r'$ travels beneath the fixed section $n^2$ of the cam-track after leaving the switch, instead of passing above and clear of this section, as before, when the rake-head acted simply as a reel-arm or beater. As soon as the bracket-roller leaves the heel end of the cam-track section $n^2$ the rake-teeth are thrown up by the rocking of the bracket.

In order to prevent entanglement of the grain with the rake-head brackets and to prevent undue accumulation of grain at the inner side of the platform, the inner fence or grain-guard, V, is inclined so as to project inward at top and slightly overhang the platform. The grain as it is cut and falls upon the platform is thus deflected inward beyond the base of the fence. To most effectually prevent entanglement of the grain with the brackets, both as it is being reeled in and after it is cut, each rake-head is provided at its inner end with an inclined tooth, V', which may be formed of metal or other suitable material. This tooth, as shown, is detachably secured to the rake-head, and is formed by a plate of triangular shape, with an inclination upward and outward or toward the outer end of the rake-head from its point of greatest depth, which is at the inner end. This plate-tooth is secured to the rake-head by a screw, $v$, passing through its shank $v'$ into the rake-head, and by a loop, $v^2$, engaging one of the ordinary or pin rake-teeth. As the grain is being reeled in by the rake-heads the stalks are inclined or pressed away from the fence V by the inclined teeth. Obviously such stalks as may fall close into the fence are crowded or pressed toward the center of the platform by the action of the inclined teeth as gavels are being swept off.

In order that the raking of gavels from the platform may be accomplished automatically and the action of the rocking rake-heads be controlled so that a rake-head may be caused to work as a rake at any desired and regularly-recurring intervals without interfering with the action as reel-beaters only of the remaining rake-heads, we employ mechanism such as now to be described.

The rotating carrier N', being provided with scrolls $w\ w\ w\ w$ on its under side, constitutes a scroll-gear for actuating a pinion, W, rotating with a shaft, W', which shaft may be slid endwise in the pinion by means of a spline and groove, as is well understood, without changing the position of the pinion or affecting the connection by which the shaft is rotated by the pinion. In the organization of mechanism in this instance employed four rake-heads are to be used. There is a scroll, $w$, provided for each rake, and the pinion W is provided with twelve teeth, so that one revolution of the shaft W' takes place for three revolutions of the scroll-gear or rake-carrier N', causing each rake to make three revolutions, or causing in the aggregate twelve revolutions of the rakes. The shaft W' in this instance is mounted to slide freely in suitable bearings formed in or attached to the rake-standard at the front and back of the recess in which the pinion is located, at the side of the rake-standard next the driving-wheel.

Instead of sliding the shaft W' to adjust the gang of cams next to be described, the cams may be caused to slide on this shaft. A disk or washer, $w'$, is fixedly secured upon the shaft W' in front of the rake-standard, and a cam-wheel or series of cam-wheels—in this instance four in number—are detachably mounted upon the shaft in advance of the fixed washer $w'$. These cams $x\ x'\ x^2\ x^3$ are arranged upon their shaft alternately with separating disks or washers X X' $X^2$ $X^3$, the washers being of greater diameter than the cams, so as to form an annular way or groove around each cam between the surfaces of the two washers at the sides thereof. The series of cams and washers are removably locked upon their shaft by means of a pin, $w^2$, rigidly connected with the fixed washer $w'$ and fitting in perforations in the cams and washers. A plain-edged disk or small washer, $x^4$, is fitted on the shaft next the washer $X^3$, and outside of this small disk a washer, $X^4$, similar to those used between the cams, is fitted upon the shaft and secured against displacement by a nut screwed on the end of the shaft. A way or groove is formed around the plain-edged disk $x^4$ between the washers at its sides, as already explained with reference to the cams and their washers. The innermost cam, $x$, of the series is provided on its periphery with two cam-surfaces, formed by curved tooth-like projections, (see Fig. 10,) which terminate abruptly or in shoulders, like ratchet-teeth. The cam $x'$ has three such projections, and the cams $x^2$ and $x^3$ have respectively four and six of these projections. A shipping-lever, Y, serves to slide the shaft W' inward and outward in its bearings, so as to bring any desired cam of the series into position to operate upon the tripping-lever S', as will presently be explained. The lever Y is shown as pivoted upon a post or bracket, Y', secured to the finger-beam, and as provided with a toothed arc, $y$, to engage the cam-separating washers. This lever may be modified in form, and it may be suitably supported otherwise than by the post on the finger-beam.

The before-described lever T' serves to set the rakes for automatic action, as desired, as will now be explained.

The cam-shaft W' (or the series of cams if made to slide upon instead of with the shaft) can be adjusted so that the nose $T^2$ of the lever T' may be caused to bear upon any one of the cams, and when the cams are so adjusted the lever T' is held against lateral movement by the guideway formed by the washers at the sides of the particular cam on which the nose $T^2$ is bearing. The driver, while in his seat, may change the adjustment as often as desirable by operating the treadle to lift the nose of the lever, then shifting the shaft W' by the lever Y and releasing the treadle to allow the setting-lever to rock downward as acted upon by the springs and present its nose to the selected cam. When the setting-lever nose is adjusted between the washers $X^3$ $X^4$, so as to bear upon the plain or uncammed disk $x^4$, this disk acts simply as a stop to prevent too great downward movement of the nose end of the setting-lever, and with the parts so adjusted each rake will sweep the platform and deliver a gavel if left free to act automatically; or the action of the rakes may be controlled by the driver in the manner already described. When the setting-lever nose is adjusted for actuation by the two-toothed cam $x$ there will be a rake-head thrown into action for every one and one-half revolution of the rake-carrier N', causing every sixth rake to deliver a gavel. When the three-toothed cam $x'$ is borne upon by the nose of the setting-lever there will be a raking action once for every revolution of the rake-carrier, causing every fourth rake to deliver a gavel. When the four-toothed cam $x^2$ is borne upon by the lever-nose there will be an automatic raking action once during every three-fourths of a revolution of the rake-carrier, causing every third rake to deliver a gavel; and when the six-toothed cam is borne upon by the lever-nose there will be a raking action for every one-half revolution of the carrier, causing every second rake to deliver a gavel.

The operation of the rakes automatically will best be understood by inspection of Figs. 2, 8, 9, and 10, in which latter figure the lever T' is represented as actuated by the cam $x^2$. When, by the revolution of the carrier and scroll-gear, one of the depressions between the teeth of the cam is presented to the nose of the setting-lever, the nose is rocked downward by spring-pressure, and the hooked end of the tripping-lever is rocked upward to lock the cam-switch. A rake-head, being thus held against rocking by the locked switch, sweeps the grain from the platform. The switch-locking arm is disengaged from the tripping-lever before the next rake reaches the switch, owing to the action of the cam upon the setting-lever nose in such manner as to rock it upward, and so allow the tripping-lever nose to be rocked downward by the action of the spring, as before explained. The switch, now being unlocked, is opened two times in succession (assuming the cam $x^2$ to be employed) by rake-heads, the third rake-head acting as a rake proper, as above explained. The driver may, if he prefers, prevent the automatic raking action by operating the treadle to control the tripping-arm. As all of the cams are formed like that illustrated by Fig. 10, except as to the numbers of teeth, and as these numbers throughout the series of cams are common multiples of the number of teeth upon the scroll-gear-actuated pinion W of the shaft W', it is obvious that any desired number of rake-heads—say six, if preferred—may be used, with a corresponding number of scrolls, $w$, without interfering with the control of the rakes, so as to act at predetermined periods during the rotation of the rake-carrier and the continuously-imparted motion of rotation of the cams, as above explained.

It should be noticed that the rake-carrying arms $n$ travel along the cam-track $n'$ somewhat in advance of the rollers $r'$, so that in event of the switch-locking arm being disengaged from the tripping-lever when the nose of the latter is in its elevated position the arm $n$ of the first rake reaching the switch will press the switch down and force its locking-arm against and along the inclined nose of the tripping-lever and into engagement with the hook or shoulder thereof before the roller $r'$ bears against the under side of the switch with a tendency to open it. In this way accidental failure of the rake to sweep the gavel off at a predetermined time is prevented.

It should further be noticed that the series of rotary rake-controlling cams is positively actuated by mechanism which imparts the proper rotary motion from the rake-rotating mechanism, and thus the cams are operated with certainty and independently of any tripping or striking action of the rakes.

We are well aware that it is not new, broadly considered, to raise and lower the finger-beam, &c., of a harvester by means of a screw-shaft, or to adjust the grain-wheel relatively to the finger-beam simultaneously and correspondingly with the adjustment of the inner end of the finger-beam; and we do not therefore unqualifiedly claim a screw-shaft and co-operating mechanism for adjusting the finger-beam and platform; nor do we unrestrictedly claim a flexible connection between the main frame, finger-beam, and grain-wheel, as, broadly considered, such connection is older than our invention. Neither do we unqualifiedly claim either rocking rake-heads controlled in their action by foot-treadles connected with tripping mechanism or automatically-actuated rakes having rotary cam-controlling devices, as such, broadly considered, are older than our invention.

We claim as of our own invention—

1. The combination, substantially as hereinbefore set forth, of the main frame, the finger-beam, the adjusting-rod with which the finger-beam is connected at its heel, the main-frame lug in which the lower end of the adjusting-rod is supported, and the main-frame lug provided with the slot through which the adjusting-rod passes, for the purpose described.

2. The combination, substantially as hereinbefore set forth, of the finger-beam, the lugs at the heel thereof, the adjusting-rod passing through the upper one of said lugs and threaded to match a screw formed in the lower lug, through which it also passes, the main-frame lug in which the adjusting-rod is supported beneath the threaded lug of the finger-beam, the main-frame lug through which the adjusting-rod passes above the upper lug of the finger-beam, the pulleys at the inner and outer ends of the finger-beam, the vertically-adjustable grain-wheel, the downwardly-projecting arm of the main frame, and the flexible connection between said arm and the grain-wheel, for the purpose described.

3. The combination of the sleeve J, the lever, segment-gear, and detent-rod thereof, and the adjusting-rod on which the sleeve turns, substantially as and for the purpose hereinbefore set forth.

4. The combination, substantially as hereinbefore set forth, of the main frame, the finger-beam, the adjusting-rod with which the finger-beam is connected at its heel, the main-frame lug in which the lower end of the adjusting-rod is supported, the main-frame lug provided with an elongated slot through which the adjusting-rod passes, the sleeve turning on the adjusting-rod, the toothed arc secured to the sleeve, the rack with which said arc engages, the lever, and its detent devices, for the purpose described.

5. The combination of the main frame, the threaded turning and rocking adjusting-rod, the finger-beam supported thereby, and provided with the threaded lug in which the rod works, the main-frame lug by which the rod is supported at bottom, the main-frame lug by which the adjusting-rod is supported above its connection with the finger-beam and guided in its rocking movements, the crank by which to turn the rod to raise and lower the finger-beam, the sleeve on the rod, and means for turning the sleeve to rock the rod, substantially as hereinbefore set forth.

6. The combination of the rake-head and the inclined grain-deflecting plate-tooth at the inner end thereof, substantially as and for the purpose described.

7. The inclined tooth V', provided with the loop and shank by which to attach it to the rake-head, substantially as described.

8. The combination of the stud or roller $p$, its overhanging support, and the trip-lug $R^2$ of the oscillating rake-head, acted upon by said roller to rock the rake-teeth downward, substantially as and for the purpose hereinbefore set forth.

9. The combination of the rake-standard, the roller mounted on the overhanging arm, the series of rake-arms, and their oscillating brackets rocked by said roller to turn down the rake-teeth preparatory to entering the standing grain, substantially as and for the purpose hereinbefore set forth.

10. The combination of the rake-head, the hinged rotating rake-carrying arm, the oscillating bracket by which the rake-head is mounted upon its carrying-arm, the spring acting to rock up the rake-teeth or hold them up, the cam-track, the cam-track traveling roller, and means by which to rock the rake-head against the force of the spring by which the rake-teeth are sustained in their elevated position and direct the roller outside of or beneath the cam-track, substantially as and for the purpose hereinbefore set forth.

11. The combination, substantially as hereinbefore set forth, of the rake-head, the oscillating bracket by which it is mounted on its hinged carrying-arm, the rotating carrier, the cam-track, the cam-track traveling roller on the bracket, the overhanging arm provided with the roller, and the trip-lug roller actuated on the bracket, for the purpose described.

12. The bracket Q, provided with the bearings to fit upon the rake-carrying arm, and having the roller-actuated curved arm or trip-lug, and the cam-track traveling roller, as and for the purpose described.

13. The combination of the rake-head, the hinged rake-carrying arm, the bracket fitted by its bearings to rock on said arm, the spring acting to rock up the rake-teeth, and the roller-actuated trip-lug of the bracket by which the rake-teeth are rocked down against the force of the spring, substantially as and for the purpose hereinbefore set forth.

14. The combination of the rotating carrier, the rake-carrying arm hinged thereto, the rake-head, the oscillating bracket to which it is secured, the bracket-bearings fitted to the rake-carrying arm, the spring acting upon the bracket to hold up the rake-teeth, the cam-track traveling roller, the trip-lug on the bracket, and the stop-lug at the heel of the bracket, abutting against the shoulder of the rake-carrying arm to limit the rocking movement of the rake-head, substantially as and for the purpose hereinbefore set forth.

15. The combination of the rake-standard, the rotating carrier, the cam-track, the overhanging arm, its roller, the series of rake-carrying arms, the rake-heads, and the oscillating brackets actuated by the roller to rock down the rake-teeth, substantially as and for the purpose hereinbefore set forth.

16. The combination of the fixed sections of the cam-track, the cam-switch, its locking-arm, the tripping-lever, the rake-head, the oscillating bracket, its roller, the carrying-arm, the spring acting on the bracket, and the stop-lug for limiting the oscillation of the bracket, substantially as hereinbefore set forth.

17. The combination of the cam-switch, its locking-arm, the tripping-lever, the foot-treadle, and the connections between the treadle and tripping-lever, by which said lever may be moved in either direction to engage or release the switch-locking arm, substantially as hereinbefore set forth.

18. The combination, substantially as hereinbefore set forth, of the cam-switch, the locking-arm thereof, the tripping-lever, the rocking-lever provided with the heel-projection crossing beneath the tripping-lever, and the springs acting upon said levers with a tendency to hold the tripping-lever engaged with the switch-locking arm, for the purpose described.

19. The combination of the revolving rake-heads, the constantly-revolving cam or series of cams, and mechanism actuated thereby for controlling the action of the rakes, substantially as hereinbefore set forth.

20. The combination of the rake-heads, the revolving cam or series of cams, and cam-operating mechanism actuated by the rake-rotating mechanism, by which the rotary motion is imparted to the cam or series of cams independently of the rakes, substantially as and for the purpose hereinbefore set forth.

21. The combination, substantially as hereinbefore set forth, of the rake-standard, the series of revolving rising and falling rake-heads, the cam-track, its switch, the setting-lever by the actuations of which the switch-tripping lever is operated to lock and release the switch, the rotating adjustable cam or series of cams for actuating the setting-lever, and cam-rotating mechanism actuated independently of the rakes, for the purpose described.

22. The combination, substantially as hereinbefore set forth, of the rake-standard, the series of revolving rising and falling rake-heads, the cam-track, the cam-switch, the cam-track traveling rollers of the rake-heads, the tripping-lever, the vertically-rocking setting-lever acting upon the tripping-lever, a cam acting upon the setting-lever and in contact with which the lever is held by spring-pressure, and the rotating shaft upon which the cam is fixed, for the purpose described.

23. The combination of the rake-standard, the rotating rake-carrier, the pinion geared with the rake-carrier, the shaft on which the pinion is mounted, the cam or series of cams, and mechanism actuated by the cam or cams for controlling the action of the rakes, substantially as hereinbefore set forth.

24. The combination, substantially as hereinbefore set forth, of the rake-standard, the rotating rake-carrier, the scroll-gear, the pinion actuated thereby, the cam or series of cams rotating with said pinion, and the shipping-lever, for the purpose described.

25. The combination, substantially as hereinbefore set forth, of the rake-standard, the rotating rake-carrier, the scroll-gear, the pinion actuated thereby, the shaft rotating with said pinion, the cam or series of cams on said shaft, and the shipping-lever, for the purpose described.

26. The combination, substantially as hereinbefore set forth, of the rotating rake-carrier, the rake-carrying arms, the oscillating brackets, the cam-track, the cam-switch, the cam-track traveling rollers, the tripping-lever, the switch-locking arm, the setting-lever, springs acting upon said tripping-lever and setting-lever, the cams acting upon the setting-lever, and the rotating shaft upon which said cams are mounted.

27. The combination of the rake-standard, the rotating shaft supported thereby, the cam or series of cams on said shaft, the plain or un-cammed disk, also on said shaft, the washers between which said cams and disk are secured, the setting-lever provided with the curved nose and shoulder, and the shipping-lever, substantially as and for the purpose hereinbefore set forth.

In testimony whereof we have hereunto subscribed our names.

FRANK BRAMER.
G. G. CROWLEY.

Witnesses:
WATTS T. LOOMIS,
JOHN W. FITZGERALD.